US008332909B2

(12) United States Patent
Chatterjee et al.

(10) Patent No.: US 8,332,909 B2
(45) Date of Patent: Dec. 11, 2012

(54) AUTOMATED SOFTWARE RESTRICTION POLICY RULE GENERATION

(75) Inventors: Arindam Chatterjee, Redmond, WA (US); Varugis Kurien, Sammamish, WA (US); Bental Tagor, Sammamish, WA (US); Sanjeev Dwivedi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1029 days.

(21) Appl. No.: 12/335,549

(22) Filed: Dec. 16, 2008

(65) Prior Publication Data

US 2010/0154026 A1   Jun. 17, 2010

(51) Int. Cl.
*H04L 29/06* (2006.01)
*G06F 7/04* (2006.01)
*G06F 17/00* (2006.01)
*G06F 17/30* (2006.01)

(52) U.S. Cl. .................................. 726/1; 726/2; 713/167
(58) Field of Classification Search ........................ None
See application file for complete search history.

(56) References Cited

U.S. PATENT DOCUMENTS

| | | | |
|---|---|---|---|
| 5,950,195 A | 9/1999 | Stockwell et al. | |
| 7,007,032 B1* | 2/2006 | Chen et al. | 707/693 |
| 7,350,204 B2 | 3/2008 | Lambert et al. | |
| 8,108,937 B1* | 1/2012 | Sallam | 726/27 |
| 2003/0120603 A1* | 6/2003 | Kojima et al. | 705/54 |
| 2003/0226038 A1 | 12/2003 | Raanan et al. | |
| 2005/0044399 A1* | 2/2005 | Dorey | 713/200 |
| 2005/0262558 A1* | 11/2005 | Usov | 726/22 |
| 2007/0043943 A1* | 2/2007 | Peretti | 713/167 |
| 2007/0191108 A1 | 8/2007 | Brunet De Courssou et al. | |
| 2007/0240147 A1 | 10/2007 | Bernabeu-Auban et al. | |
| 2007/0240194 A1* | 10/2007 | Hargrave et al. | 726/1 |
| 2007/0261051 A1 | 11/2007 | Porter et al. | |
| 2008/0091682 A1* | 4/2008 | Lim | 707/9 |
| 2008/0109871 A1* | 5/2008 | Jacobs | 726/1 |
| 2009/0094667 A1* | 4/2009 | Habeck et al. | 726/1 |
| 2009/0178103 A1* | 7/2009 | Graham et al. | 726/1 |
| 2009/0228973 A1* | 9/2009 | Kumar et al. | 726/15 |
| 2009/0307742 A1* | 12/2009 | Forster | 726/1 |

OTHER PUBLICATIONS

"Description of the Software Restriction Policies in Windows XP", retrieved at <<http://support.microsoft.com/kb/310791>>, Jul. 26, 2002, pp. 3.
"Windows XP Security Guide", retrieved at <<http://www.microsoft.com/technet/security/prodtech/windowsxp/secwinxp/xpsgch06.mspx>>, Apr. 13, 2006, pp. 16.
"What's New in Security for Windows XP Professional and Windows XP Home Edition", retrieved at http://technet.microsoft.com/en-us/library/bb457059.aspx>>, Feb. 17, 2003, pp. 28.

(Continued)

*Primary Examiner* — Nathan Flynn
*Assistant Examiner* — Trang Doan (57) ABSTRACT

Software restriction policy rules can be automatically generated by parsing through a specified metadata source and generating the rules in accordance with indicated preferences. Metadata sources can include storage locations, such as folders, in which case rules for each executable file in the folder can be generated. Metadata sources can also include trusted publisher stores, installation logs, difference files, and other like data sources. Indicated preferences can select from among rules based on the publisher, for files that are signed, or rules based on hashes or path information for unsigned files. In generating rules to prevent the execution of specified files, if an optimized set of rules is desired, a check can be made to determine if an exception to an existing rule can be generated instead of a new rule. The automated parsing of the indicated metadata source can provide for both completeness and correctness.

20 Claims, 7 Drawing Sheets

OTHER PUBLICATIONS

"Windows PowerShell", retrieved at http://www.microsoft.com/windowsserver2003/technologies/management/powershell/default.mspx>>, Aug. 25, 2008, pp. 3.

"The Industry Insiders", retrieved at http://blogs.technet.com/industry_insiders/pages/software-restriction-policies-and-powershell-code-signing.aspx>>, Aug. 25, 2008, pp. 9.

* cited by examiner

AUTOMATED SOFTWARE RESTRICTION POLICY RULE GENERATION

BACKGROUND

To protect computing devices, and their users, from executing computer-executable instructions that may be malicious or otherwise cause unintended or unexpected consequences, a "software restriction policy" can be implemented, whereby only pre-approved computer-executable instructions are allowed to execute on the computing device. Traditionally, an administrator of a computing device can pre-select which files, comprising computer-executable instructions, will be allowed to execute on the computing device. Thus, for example, an administrator may decide to allow only specific word processing and spreadsheet applications to execute on a computing device. Such a decision by the administrator, implemented via a software restriction policy, can, not only prevent users of such a computing device from inadvertently, or intentionally, executing malicious computer-executable instructions, but it can also prevent users from executing improper computer-executable instructions, such as games or entertainment-focused computer-executable instructions.

Traditionally, software restriction policies are defined, by an administrator, by using a file-by-file approach. Specifically, the administrator manually selects which files, comprising computer-executable instructions, are to be allowed to execute and, by definition, all of the files not included will be denied the ability to execute on the computing device implementing the software restriction policy. Unfortunately, many modern software applications comprise dozens of files with executable instructions, all of which need to be allowed to execute in order for the overall software application to execute properly. If an administrator inadvertently does not include one or more such executable files in the software restriction policy, the overall software application may not execute properly. Thus, a potentially substantial amount of trial-and-error may be required on the part of the administrator to create a software restriction policy that is "complete." Alternatively, if the administrator errs by including too many files, the software restriction policy may not provide the security that was intended. Such a software restriction policy may be complete, but it may not be "correct" given the administrator's needs and intentions.

SUMMARY

To provide a software restriction policy that is both complete and correct, automated mechanisms can obtain information regarding the files having executable instructions stored on a particular computing device, volume or folder and can, based on the obtained information, and based on preferences and hints provided by an administrator, generate one or more software restriction policies. The policies can be complete in that they can allow the execution of all required executable files, while also being correct in that they can define appropriate software restrictions for all relevant executable files.

In one embodiment, files having executable instructions stored within a selected and defined storage area, such as a folder or a volume, can be read and specific software restriction policy rules for each of the files can be generated. Subsequently, the administrator can be allowed to exclude one or more of the files, thereby preventing their execution.

In another embodiment, the administrator can be allowed to specify whether rules based on hash information or certificate information are preferred. Such preferences can be taken into account when possible, when generating the software restriction policy rules.

In a further embodiment, rather than parsing through a defined storage area, a Trusted Publisher Store can be referenced and rules can be generated enabling the execution of any file signed by a publisher whose certificate is in the Trusted Publisher Store.

In a still further embodiment, other sources of metadata, such as program listings maintained by an operating system, installation logs, or difference files can be referenced to identify one or more files for which software restriction policy rules can be created.

In a still further embodiment, optimization of software restriction policy rules can be implemented to minimize the quantity of rules, and thereby increase the efficiency with which such rules are implemented. Optimization can seek to generate exceptions to existing rules, and avoid duplication of rules, to reduce the overall quantity of rules.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

The following description relates to the automated generation of software restriction policies. Information regarding the target files that are to be impacted by the generated software restriction policies can be obtained from a variety of sources, including a scanning of folders or other storage areas selected by an administrator, installation logs, difference files, installed software listings, and the like. Alternatively, software restriction policy rules can be based on Trusted Publisher Stores, that can identify publishers whose signed files should be allowed to run. The administrator can then select specific files to be excluded from these automatically generated rules, resulting in automatically generated exclusion rules. Optimization can reduce the quantity of software restriction policy rules, by generating exceptions to existing rules, and otherwise verifying that an existing rule does not already cover a particular file prior to generating a rule for that file. The rules can be based on information contained in the certificate of signed files, on the hash values of files, or on the path describing the storage area where the file is located.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 1:
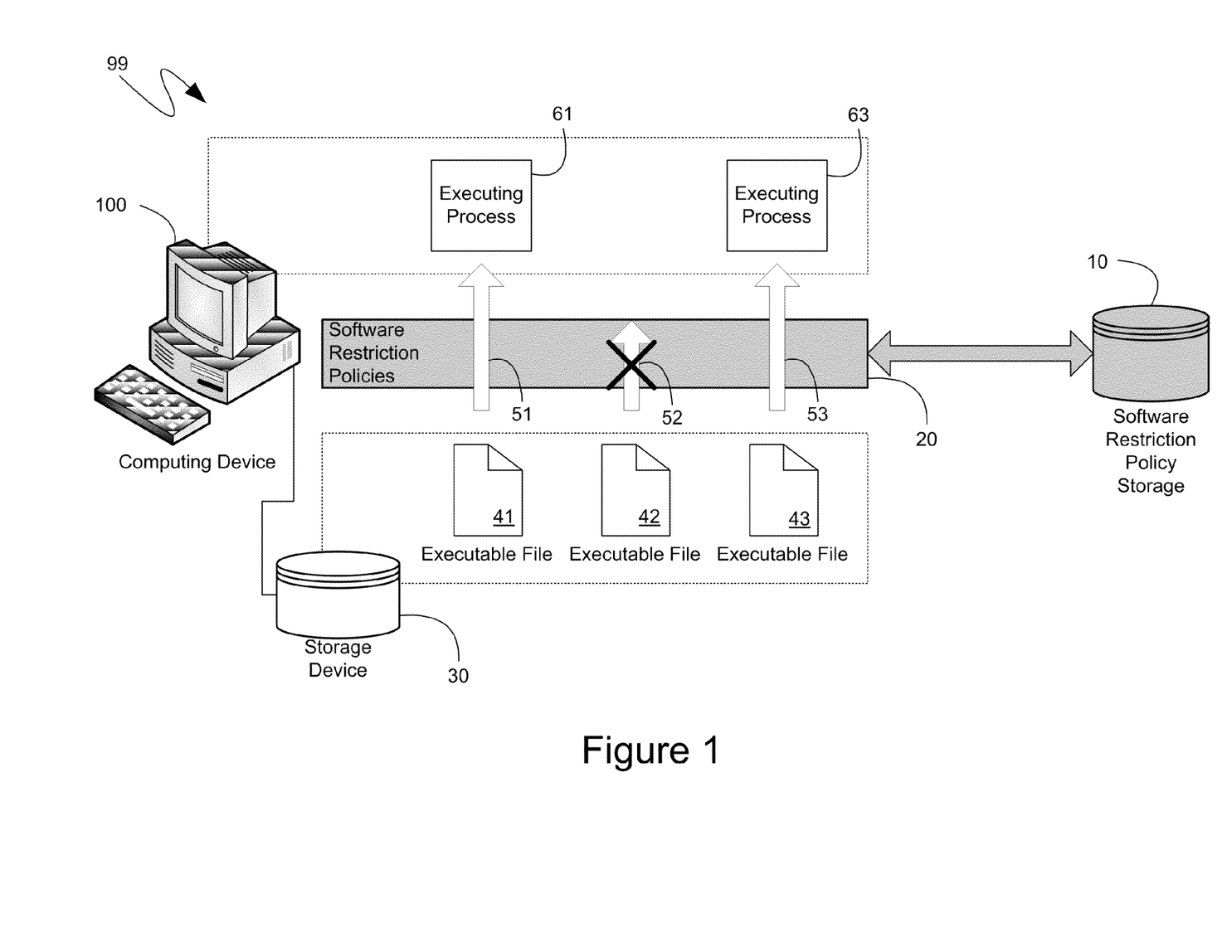
FIG. 1 is a block diagram of an exemplary implementation of software restriction policies.

Turning to FIG. 1, an exemplary system 99 is illustrated comprising a computing device 100, a storage device 30 communicationally coupled to the computing device 100, which can comprise executable files, such as executable files 41, 42 and 43, and a software restriction policy storage 10, which can be co-located with the storage device 30, or, alternatively, can be located elsewhere, and which can provide storage of some or all of the rules that comprise the one or more software restriction policies 20. As can be seen, the one or more software restriction policies 20 can prevent one or more of the executable files stored on the storage device 30 from executing on the associated computing device 100. For example, as shown, the executable file 41, stored on the storage device 30 can be allowed, by the software restriction policy 20, to execute as an executing process 61 on the computing device 100. Similarly, the executable file 43 can be allowed, by the software restriction policy 20, to execute as an executing process 63. Such allowances are illustrated via the arrows 51 and 53 respectively, illustrating the filtering nature of the software restriction policy 20. Specifically, for example, while the executable files 41 and 43 can be allowed to execute, the executable file 42 can be prevented from executing on the computing device 100 by the software restriction policy 20, as indicated by the arrow 52.

Typically, the software restriction policy storage 10 can comprise one or more rules that are applicable to the executable files stored on, for example, the storage device 30, such as executable files 41, 42 and 43. These rules can identify which of the executable files, such as executable files 41, 42 or 43 can be allowed to execute and which of them can be denied execution. One mechanism by which software restriction policy rules can identify files is by specifying a path, such that all files stored within the storage location identified by the path can be treated in an equivalent manner. While specifying files by their path can be efficient, since multiple files can be identified with a single path, it can also be less secure, since files can be allowed to execute merely by moving them into an appropriate folder.

Another mechanism by which files can be identified by software restriction policy rules is by the hash value of the file itself. As will be known by those skilled in the art, a hash of a file derives a unique value representing the file by applying mathematical operations to the bits of the file. Such a hash value can uniquely identify a file, but should one or more bits of the file change, such as when an update is performed, the hash will, likewise, change. Consequently, software restriction policy rules based on hash values may become outdated after a software program is updated and, as such, may need to be updated themselves.

Yet a third mechanism by which software restriction rules can identify the specific files to which they apply can be based on a certificate associated with the executable files. More specifically, executable files can be signed by, for example, the author of such files, such as a software publishing company. In signing the files, a certificate for each file can be created, comprising a unique identification of the file, and a unique signature of the entity signing the file. If, for example, a particular software publisher is known to be trustworthy, and software from that publisher is intended to be executed on a computing device, that computing device can implement software restriction policies that allow executable files signed by that publisher to execute. Such software restriction policy rules, therefore, identify the files to which they apply based on the signature of such files, and, more specifically, based on the entity that, either directly or indirectly, signed such a certificate.

Figure 2:
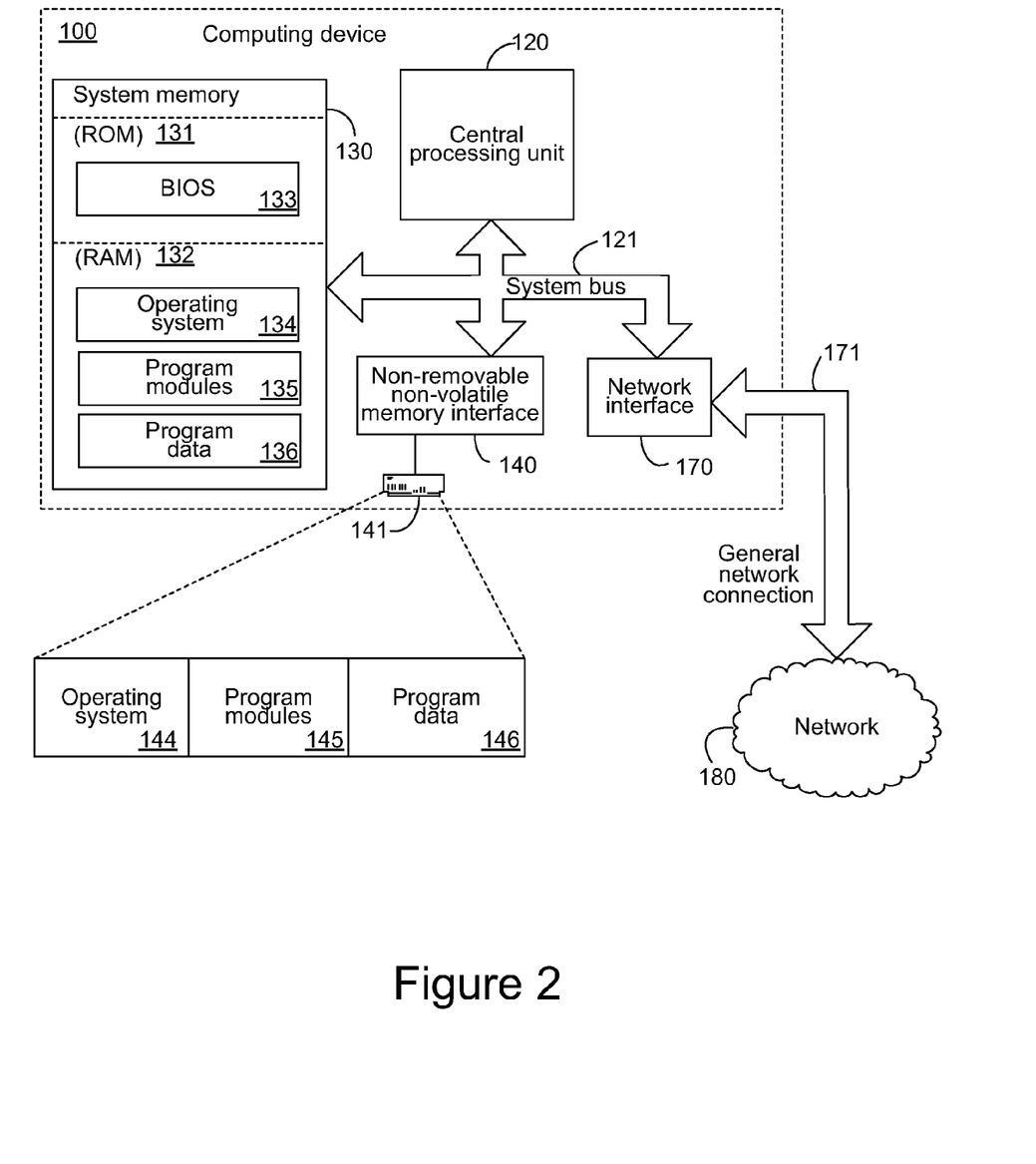
FIG. 2 is a block diagram of an exemplary computing device.

Before proceeding with further detailed descriptions regarding the automated generation of the rules stored within the software restriction policy storage 10, the framework for the below descriptions is provided with reference to FIG. 2, wherein an exemplary computing device 100, such as the one from FIG. 1, is further illustrated. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Additionally, the computing device 100 may operate in a networked environment using logical connections to one or more remote computers. For simplicity of illustration, the computing device 100 is shown in FIG. 2 to be connected to a network 180 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

With reference to FIG. 1, the storage device 30 and the software restriction policy storage 10 can be the hard disk drive 141 or any of the other above-described storage devices. Additionally, in contemplated embodiments, the software restriction policy storage 10 can be communicationally coupled to the computing device 10 via the network 180. The executable files, such as executable files 41, 42 and 43 can be some or all of the exemplary program modules 145 referenced above and, likewise, the software restriction policies 20 and the software restriction policy storage 10 can be associated with, or otherwise utilize, the exemplary program modules 145 and the exemplary program data 146.

Figure 3:
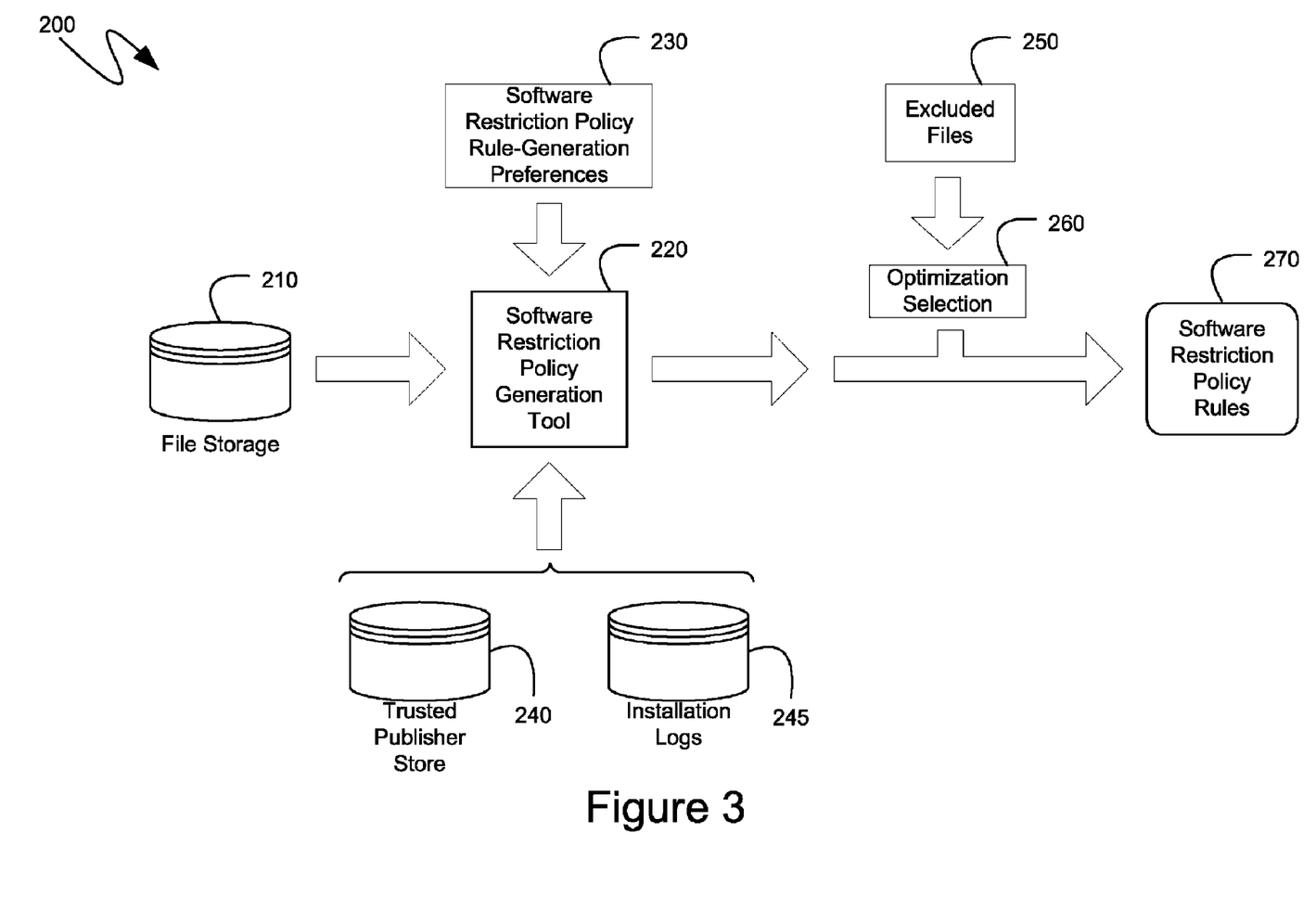
FIG. 3 is a block diagram of an exemplary automated generation of software restriction policies.

Turning to FIG. 3, the system 200 illustrates the automated generation of software restriction policy rules 270 according to a contemplated embodiment. As can be seen, a file storage 210 can be referenced by a software restriction policy generation tool 220, which will be described further below, and, in accordance with software restriction policy rule generation preferences 230 and other sources of metadata, such as a trusted publisher store 240 or installation logs 245, the software restriction policy generation tool can automatically generate software restriction policy rules 270. More specifically, the file storage 210 can comprise those files or collections of files that are provided to the software restriction policy generation tool 220, such as by an administrator, or other user of the computing device 100 that has the authority to generate software restriction policy rules, and desires to do so. For example, if the administrator just installed a new software package, the administrator can identify the folder, or other storage location, where the files for such a software package were installed, and can specify such a folder to the software restriction policy generation tool 220. In such a case, the specified folder can represent the provided file storage 210.

Once specified, the file storage 210 can be parsed by the software restriction policy generation tool 220 and software restriction policy rules 270 can be automatically generated for each of the executable files in the file storage 210. In one embodiment, the generated software restriction policy rules 270 can be guided by the software restriction policy rule generation preferences 230 specified by the administrator, or other appropriate user. The software restriction policy rule generation preferences 230 can specify, for example, what kinds of rules should be generated, if possible, by the software restriction policy generation tool 220. As indicated previously, software restriction policy rules can identify the files to which they apply by referencing a hash of the file, the signer of a file (if the file is signed), or a path at which the file can be located. Thus, for example, the administrator could specify that, if files are signed, the software restriction policy generation tool 220 should reference those files by the signing entity and, if files are not signed, then the software restriction policy generation tool should create rules for those files by referencing the files' hash values.

In parsing the identified file storage 210, the software restriction policy generation tool 220 can, for each executable file, create a software restriction policy rule that will enable the file to execute, with such a rule being in accordance with the preferences 230 provided. For example, if the administrator specified, via the preferences 230, that signature-based rules were preferred, the software restriction policy generation tool 220 could first check if an executable file in the file storage 210 was signed. If such a file was signed, the software restriction policy generation tool 220 could create a software restriction policy rule that would enable the execution of all files signed by the signer of the file currently being considered. If the file was not signed, the software restriction policy generation tool 220 could generate a rule specifying the considered file via its hash or path, again in accordance with any applicable preferences 230 that may have been specified.

In addition to allowing an administrator, or other appropriate user, to specify which files should be allowed to execute, the software restriction policy generation tool 220 can also provide for the specification of files that are to be denied the ability to execute. In one embodiment, such excluded files 250 can be identified to the software restriction policy generation tool 220 by the administrator through a user interface in which some or all of the executable files in the file storage 210 are enumerated and the administrator is allowed to select those which should be denied execution. After specifying the excluded files 520, an optional optimization selection 260 can be performed. If the software restriction policy rules 270 are to be optimized, the software restriction policy generation tool 220 can attempt to generate as few rules as possible that will still implement the administrator's intent. Specifically, prior to generating a rule to either allow execution, or deny execution, for a specific file, a check can be made to determine if a rule already exists that is applicable to the considered file. If such a rule already exists, then a second rule allowing the file to execute need not be generated and, alternatively, if the file is to be denied the ability to execute, an exception to the prior rule can be made, rather than generating a whole new rule. In such a manner, the generated software restriction policies 270 can be optimized.

In an alternative embodiment, rather than specifying a file storage 210, the software restriction policy generation tool 220 can be provided with another source from which to obtain metadata relevant to the automated creation of software restriction policy rules 270. In such a case, the ultimately generated rules 270 can be applied to all of the relevant files on the computing device 100. For example, if the administrator desired to allow the execution of all executable files that are signed by software publishers that are trusted, the administrator could direct the software restriction policy generation tool 220 to automatically generate rules allowing for the execution of files signed by publishers that are identified in the trusted publisher store 240. The software restriction policy generation tool 220 can then parse through the trusted publisher store 240 and can generate software restriction policy rules 270 that allow the execution, on the computing device 100, of any executable file that was signed, either directly or indirectly, by a publisher whose certificate is in the trusted publisher store 240.

Other sources of metadata, in addition to the trusted publisher store 240, can include installation logs 245, operating system maintained listings of installed applications, difference files that indicate the changes to a computing device's file system when a new software application was installed, or other like sources of metadata. For example, an administrator can provide, to the software restriction policy generation tool 220, one or more installation logs 245 comprising listings of the files installed on the computing device 100 as part of a software installation. The software restriction policy generation tool 220, much as it parsed through a specified file storage 210, can instead parse instead through the provided installation logs 245 and, for each executable file identified in the logs, the software restriction policy generation tool can generate a rule that can either allow or prevent that file from executing, in accordance with the administrator's specifications, as embodied by the specification of the types of rules to be generated, via the preferences 230, and in the files to be excluded 250.

Figure 4:
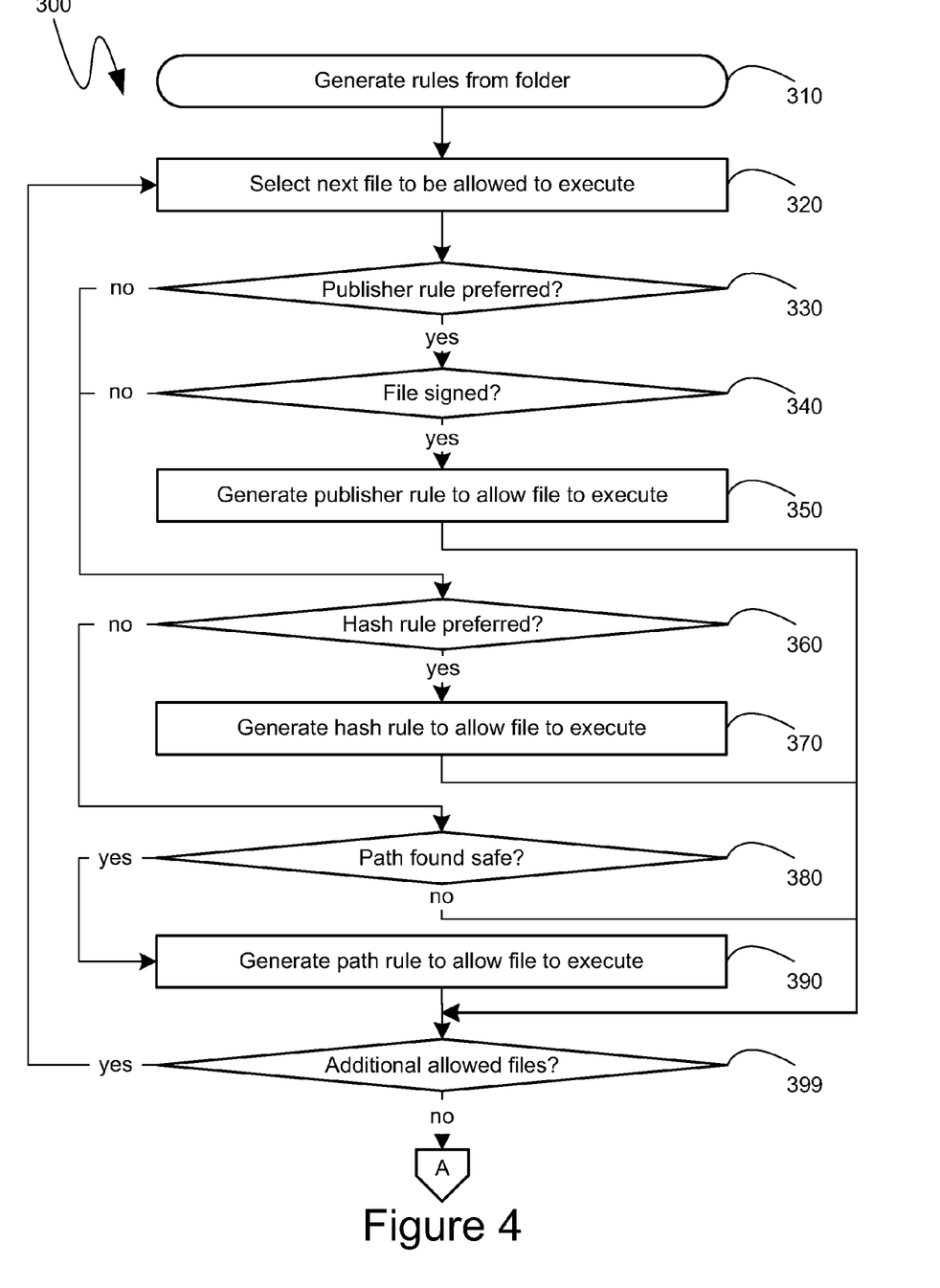
FIG. 4 is a flow diagram of a portion of an exemplary automated generation of software restriction policies.

The operation of the software restriction policy generation tool 220 is described with greater detail in the flow diagrams of FIGS. 4 through 7. Turning to FIG. 4, a flow diagram 300 is shown comprising an initial series of steps that can be implemented by the software restriction policy generation tool 220 in generating the software restriction policy rules 270 when a file storage 210 is specified. Initially, at step 310, the software restriction policy generation tool 220 can receive an instruction to generate software restriction policy rules for the executable files within a folder or other type of file storage 210. An executable file can then be selected at step 320 to initiate the automatic generation of the rules 270 by the software restriction policy generation tool 220. If the executable file selected at step 320 is signed, and if the administrator, or other appropriate user, indicated that rules based on publisher signatures were to be preferred, as determined by the decisions at steps 330 and 340, then a publisher rule for the file can be generated at step 350. As indicated previously, the publisher rule generated at step 350 can be a rule allowing the execution of all executable files signed, either directly or indirectly, by the publisher that signed the file selected at step 320.

If publisher rules were not indicated as a preferred method by which the software restriction policy generation tool 220 was to identify files in the software restriction policy rules 270 it was generating, or if the file selected at step 320 was not signed, as determined by steps 330 and 340, respectively, a determination can be made, at step 360 whether a hash rule was preferred. In one embodiment, the preferences 230 can specify alternative rule making preferences. Thus, for example, an administrator could specify that, if a file was signed by the publisher, then a publisher rule would be preferred for such a file, but if the file was not signed, then a hash rule would be preferred. The determination, at step 360, therefore, can take into account both whether a hash rule was indicated as preferred in the first place or whether a hash rule was indicated as merely a preferred alternative if the file was not signed, and that, indeed, as determined at step 340, the file was, in fact, found not to be signed. If the determination at step 360 finds that either of these two alternatives is true, the software restriction policy generation tool 220 can proceed to generate a hash rule, at step 370, for the file selected at step 320. As indicated previously, a hash rule, such as that generated at step 370 can specify that all files having a hash value equal to that obtained when the file selected at step 320 was hashed, should be allowed to execute.

However, if the determination at step 360 finds that a hash rule was not preferred, either as an alternative if the file was not signed, or as a primary selection, execution can proceed with step 380, wherein a determination can be made as to whether the path at which the file selected at step 320 is stored is found to be safe. For example, the path can be within an area that only selected users have sufficient authority to write data, or otherwise add or change executable files within that area. Alternatively, the path can point to a directory or volume that has been previously indicated by the administrator as being secure or otherwise safe. If the path is found to be safe at step 380, a path rule can be generated at step 390. As indicated previously, a path rule can be an indication to allow the execution of any executable file stored in the location specified by the path at which the file selected at step 320 is found.

If the path is, for whatever reason, found not to be safe at step 380, processing can skip to step 399, at which a determination can be made as to whether there are any other files within the location specified at step 310 that need to be processed to create software restriction policy rules to allow for the execution of such files. If there are such other files within the specified location, processing can return to step 320, wherein another file can be selected and the above described processing can be performed again with respect to such a newly selected file. If there are no other files, as determined at step 399, processing can proceed to the flow diagram 400 of FIG. 5.

Figure 5:
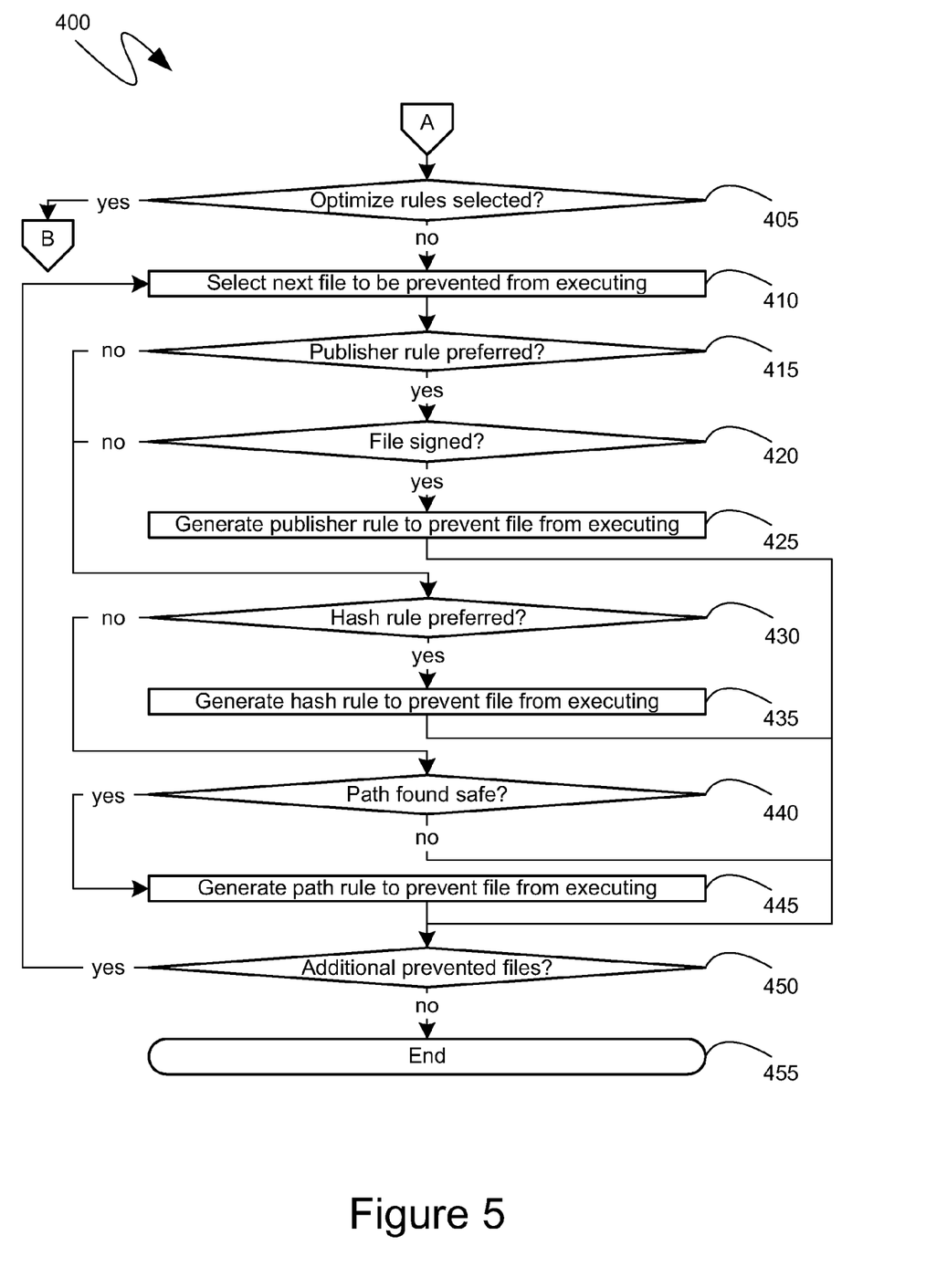
FIG. 5 is a flow diagram of another portion of an exemplary automated generation of software restriction policies.

Turning to FIG. 5, flow diagram 400 illustrates one series of steps by which software restriction policy rules preventing selected executable files from executing can be automatically generated by the software restriction policy generation tool 220. As shown, once processing associated with the files to be allowed to execute is completed, such as can be determined at step 399, a subsequent determination, at step 405, can determine whether an administrator, or other appropriate user, has requested that the generated software restriction policy rules 270 be optimized to reduce the overall quantity of rules. If such a request has been made, as determined at step 405, processing can proceed with the steps of flow diagram 500 of FIG. 6. If optimization was not selected, as determined at step 405, the files of the location specified at 310 can be presented to the administrator, or other appropriate user, to select those files that are to be prevented from executing. Once such selection is made, the selected files can be processed. At step 410, the next executable file that is to be prevented from executing can be selected. As before, a determination can be made as to the types of rules, if any, that were specified as a preference and, whether or not the file is signed, as indicated by the determinations at step 415 and 420. If a publisher rule was indicated as preferred, and if the file to be prevented from executing is signed, the software restriction policy generation tool 220 can, at step 425, generate a publisher rule to prevent the file from executing. As with the publisher rule generated at step 350, and described above, the publisher rule generated at step 425 can prevent the execution of any signed executable files that have been signed by the specified publisher.

If either publisher rules were not preferred, or if the file was not signed, then, at step 430, a determination can be made as to whether hash rules were selected, either as a primary choice, or as a secondary choice to be utilized if the file was not signed. If hash rules were selected, then at step 435, a hash rule can be generated to prevent the file selected at step 410 from executing. As indicated previously with reference to step 370, a hash rule can specify the file to which it is directed by reference to the value obtained when the file is hashed. In the case of step 435, the generated hash rule is designed to prevent, rather than allow, execution of the specified file. If, however, hash rules were not selected, then at step 440, a determination can be made regarding the safety of the path identifying the storage location where the file selected at step 410 is located. If the path is determined to be safe at step 440, such as in the manner described above with reference to step 280, then, at step 445, a path rule can be generated to prevent the execution of all files with the specified path. Subsequently, at step 450, a check can be made to determine if there are any other executable files whose execution is to be prevented. If there are, processing can return to step 410 and select another such executable file. If no such files remain, processing can end at step 445.

Of course, as can be seen, the processing illustrated in the flow diagram 400 of FIG. 5 can produce rules that prevent executable files from executing that are similar to rules that allow the execution of other executable files, such as rules generated via the steps of flow diagram 300 of FIG. 4, described above. To reduce the overall quantity of software restriction policy rules generated, an optimization can be applied. As indicated, at step 405, before generating the rules directed to the prevention of execution of specific files, a check can be made to determine if the rules are to be optimized.

Figure 6:
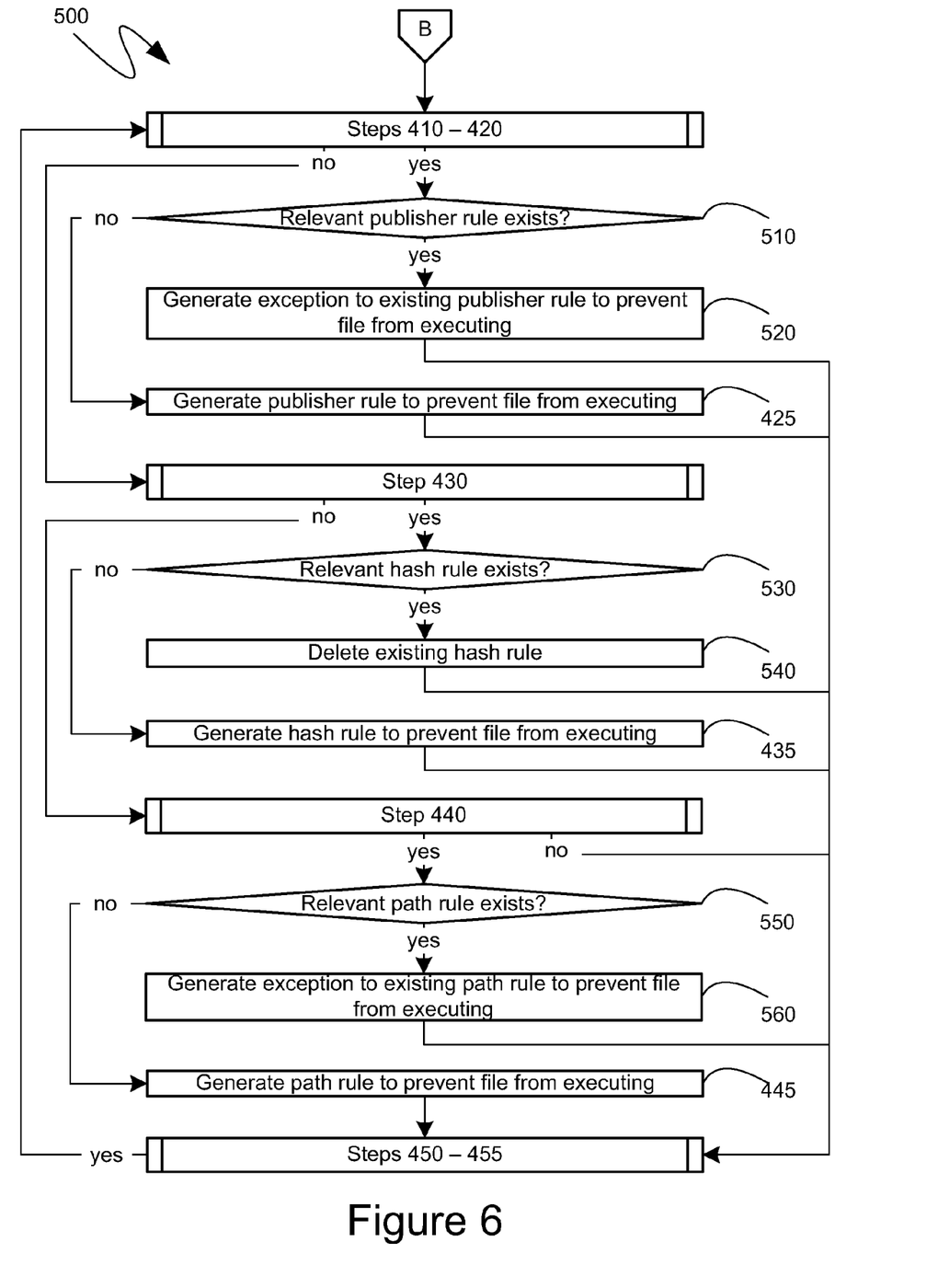
FIG. 6 is a flow diagram of yet another portion of an exemplary automated generation of software restriction policies.

If the rules are to be optimized, processing can proceed as illustrated in flow diagram 500 of FIG. 6. To illustrate steps relevant to the optimization of rules, according to one embodiment, the flow diagram 500 of FIG. 6 illustrates those steps, while only numerically referencing previously described steps. Thus, for example, as can be seen from the flow diagram 500 of FIG. 6, the steps of 410, 415 and 420, as described previously, can likewise be performed as part of the flow diagram 500. If the result of those steps is a determination that the file is signed and that a publisher rule was preferred, a check can be made at step 510 as to whether a relevant publisher rule, referencing the publisher of the selected file, already exists. For example, such a rule could have been created to allow the execution of a file, such as described above with reference to step 350. If no such rule already exists, a publisher rule to prevent the execution of the selected file can be created at step 425 in the manner described above. However, if such a relevant publisher rule already exists, as determined by step 510, at step 520, rather than creating a new rule, as would be done by step 425, an exception to the existing rule, preventing the selected file from executing, can instead be created. In such a manner, the overall quantity of rules can be minimized, since step 520 would not create a new rule, but would, instead, modify an existing rule.

The remaining processing of flow diagram 500 can, in a similar manner, seek to minimize the quantity of software restriction policy rules generated by attempting to create exceptions to existing rules. Thus, for example, if the selected file is not signed, or if publisher rules were not selected, processing can proceed with step 430, as described previously, wherein a check is made to determine if hash rules were selected. If they were, then, subsequently, at step 530, a check can be made to determine if a relevant hash rule already exists. For example, such a rule may have been generated at step 370, described previously. If step 530 does not identify an existing hash rule, then a hash rule preventing execution of the selected file can be created at step 435, as described previously. However, if an existing hash rule is found at step 530, then at step 540, it can be deleted. As will be known by those skilled in the art, because a hash value can uniquely identify a single file, it can be difficult to create an exception to a hash-based rule. Instead, the existing rule, found at step 530, identifying the same file, can simply be deleted or otherwise changed into a rule that can prevent the execution of the file.

If step 430 determined that hash rules were not selected, processing can proceed, as described previously, to step 440 to determine if path rules were selected. If path rules were selected, a check can be made, at step 550, to determine if an existing path rule exists, such as, for example, a path rule that can have been created at step 390, as described above. If, at step 550, no existing path rule is found, then at step 445, a path rule can be generated as described above. However, if, at step 550, an existing path rule is found, then, at step 560, an exception to the existing path rule can be created to prevent the selected file from executing, while not increasing the quantity of rules. Processing can then complete with steps 450 through 455, as described previously.

While the flow diagrams 300, 400 and 500, of FIGS. 4, 5 and 6, respectively, illustrate an embodiment where the software restriction policy generation tool 220 generates the software restriction policy rules 270 by parsing a file storage 210 to which it is directed, other embodiments, as previously described, contemplate the generation of the software restriction policy rules 270 from other sources of metadata, such as the trusted publisher store 240, the installation logs 245, the operating system's log of installed software, difference files generated when new software was installed, or other like metadata sources. When generating the software restriction policy rules 270 from such other sources of metadata, the software restriction policy generation tool can parse such other sources of metadata and generate one or more rules appropriate for the information contained within the metadata source being parsed. For example, when generating the software restriction policy rules 270 from a metadata source such as the trusted publisher store 240, the software restriction policy generation tool 220 can cycle through the trusted publisher store and can generate a publisher rule for each publisher listed in the trusted publisher store 240. Alternatively, when generating the software restriction policy rules 270 from a metadata source such as the installation logs 245, the software restriction policy generation tool 220 can cycle through the files listed in an installation log, such as, for example, an installation log of a software program that the administrator wishes to create a set of software restriction policy rules for, and can generate a hash rule for each file listed in that log.

Figure 7:
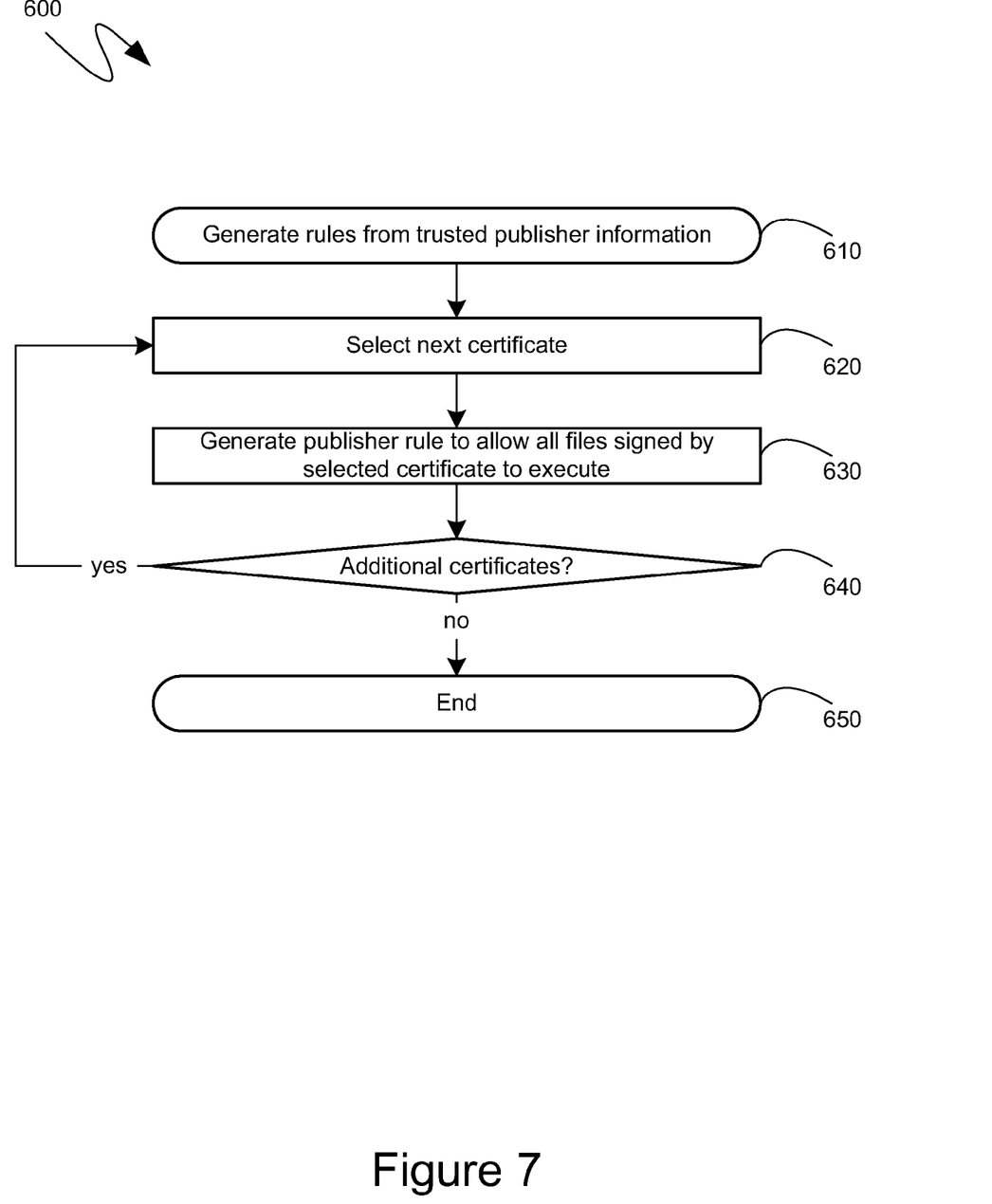
FIG. 7 is a flow diagram of another exemplary automated generation of software restriction policies.

Turning to FIG. 7, a flow diagram 600 illustrates an exemplary series of steps that can be performed by the software restriction policy generation tool 220 when generating a set of software restriction policy rules 270 from a metadata source other than the file storage 210. For the sake of illustration and description, the flow diagram 600 illustrates an exemplary series of steps that can be performed when generating rules from the trusted publisher store 240, although the steps are analogous for other types of metadata sources, as one of skill in the art would recognize.

Initially, at step 610, the software restriction policy generation tool 220 can be directed to generate a set of software restriction policy rules 270 from a metadata source, in this example, the trusted publisher store 240. Subsequently, at step 620, a certificate from the trusted publisher store 240, associated with a publisher, can be selected. At step 630, a publisher rule, such as those described previously, can be generated, providing for the execution of executable files that are signed by the same publisher whose certificate was selected at step 620. After an appropriate rule, such as that created at step 630, is created, a check can be made, at step 640, to determine if there is additional content, such as additional certificates, in the metadata source specified at step 610. If such other content exists, such as, for example, if step 640 determines that there are other publisher certificates in the trusted publisher store 240 that have not yet been processed, processing can return to step 620 and select the next certificate. If, however, step 640 determines that the processing of the metadata source is complete, processing can end at step 650.

As can be seen from the above descriptions, mechanisms for automatically generating a set of software restriction policy rules have been provided. In view of the many possible variations of the subject matter described herein, we claim as our invention all such embodiments as may come within the scope of the following claims and equivalents thereto.

We claim:

1. One or more computer-readable storage media comprising computer-executable instructions for generating software restriction policy rules, the computer-executable instructions directed to steps comprising:
receiving a user's specification of preferred types of software restriction policy rules that are preferred by the user;
receiving the user's specification of a metadata source;
determining a software restriction policy rule for each entry in the metadata source in accordance with the specified preferred types of software restriction policy rules;
determining if the software restriction policy rule is duplicative of a previously generated software restriction policy rule;
determining if the software restriction policy rule is an exception to the previously generated software restriction policy rule;
generating the software restriction policy rule determining reveals that the software restriction policy rule is neither duplicative of the previously generated software restriction policy rule nor is the exception to the previously generated software restriction policy rule; and
generating the exception to the previously generated software restriction policy rule instead of generating software restriction policy rule if the determining reveals that the software restriction policy rule is not duplicative of the previously generated software restriction policy rule but is the exception to the previously generated software restriction policy rule.

2. The computer-readable storage media of claim 1, further comprising computer-executable instructions for receiving a user's specification of entries in the metadata source for which software restriction policy rules preventing execution are to be generated; wherein the generating the software restriction policy rule for each entry in the metadata source comprises: generating an allow software restriction policy rule, which allows the execution of applicable executable files, if an entry for which the allow software restriction policy rule is generated is not among the specified entries; and generating a deny software restriction policy rule, which prevents the execution of applicable executable files, if an entry for which the deny software restriction policy rule is generated is among the specified entries.

3. The computer-readable storage media of claim 2, wherein the generating the deny software restriction policy rule comprises generating, as the deny software restriction policy rule, an exception to an existing allow software restriction policy rule.

4. The computer-readable storage media of claim 1, wherein the received user's specification of preferred types of software restriction policy rules that are preferred by the user specifies at least one of: a publisher-based rule, a hash-based rule, and a path-based rule.

5. The computer-readable storage media of claim 1, wherein the metadata source specified by the user comprises a trusted publisher store; and wherein further the each entry in the metadata source comprises a trusted publisher's certificate in the trusted publisher store.

6. The computer-readable storage media of claim 1, wherein the metadata source specified by the user comprises a folder; and wherein further the each entry in the metadata source comprises an executable file in the folder.

7. The computer-readable storage media of claim 6, wherein the received user's specification of preferred types of software restriction policy rules that are preferred by the user comprises a specification of a publisher-based rule for signed executable files and a specification of one of a hash-based rule and a path-based rule for unsigned executable files.

8. The computer-readable storage media of claim 7, wherein the generating the software restriction policy rule for each entry in the metadata source comprises: determining, for each executable file in the folder, whether the each executable file is signed; generating, for each signed executable file, the publisher-based rule; and generating, for each unsigned executable file, one of the hash-based rule and the path-based rule in accordance with the user's specification of the one of the hash-based rule and the path-based rule for unsigned executable files.

9. A computer-implemented method that generates computer readable software restriction policy rules, the method comprising the steps of:
receiving, via user input provided to the computing device, a user's specification of preferred types of software restriction policy rules that are preferred by the user;
receiving, via user input provided to the computing device, the user's specification of a metadata source;
utilizing a central processing unit of the computing device to determine a software restriction policy rule for each entry in the metadata source in accordance with the specified preferred types of software restriction policy rules;
utilizing the central processing unit of the computing device to determine if the software restriction policy is duplicative of a previously generated software restriction policy rule;
utilizing the central processing unit of the computing device to determine if the software restriction policy rule is an exception to the previously generated software restriction policy rule;
generating, with the computing device, the software restriction policy rule if the determining reveals that the software restriction policy rule neither duplicative of the previously generated software restriction policy rule nor is the exception to the previously generated software restriction policy rule; and
generating, with the computing device, the exception to the previously generated software restriction policy rule instead of generating the software restriction policy rule if the determining reveals that the software restriction policy rule is not duplicative of the previously generated software restriction policy rule but is the exception to the previously generated software restriction policy rule.

10. The method of claim 9, further comprising the step of receiving a user's specification of entries in the metadata source for which software restriction policy rules preventing execution are to be generated; wherein the generating the software restriction policy rule for each entry in the metadata source comprises: generating, with the computing device, an allow software restriction policy rule, which allows the execution of applicable executable files, if an entry for which the allow software restriction policy rule is generated is not among the specified entries; and generating, with the computing device, a deny software restriction policy rule, which prevents the execution of applicable executable files, if an entry for which the deny software restriction policy rule is generated is among the specified entries.

11. The method of claim 10, wherein the generating the deny software restriction policy rule comprises generating, with the computing device, as the deny software restriction policy rule, an exception to an existing allow software restriction policy rule.

12. The method of claim 9, wherein the received user's specification of preferred types of software restriction policy rules that are preferred by the user specifies at least one of: a publisher-based rule, a hash-based rule, and a path-based rule.

13. The method of claim 9, wherein the metadata source specified by the user comprises a trusted publisher store; and wherein further the each entry in the metadata source comprises a trusted publisher's certificate in the trusted publisher store.

14. The method of claim 9, wherein the metadata source specified by the user comprises a folder; and wherein further the each entry in the metadata source comprises an executable file in the folder.

15. The method of claim 14, wherein the received user's specification of preferred types of software restriction policy rules that are preferred by the user comprises a specification of a publisher-based rule for signed executable files and a specification of one of a hash-based rule and a path-based rule for unsigned executable files.

16. The method of claim 15, wherein the generating the software restriction policy rule for each entry in the metadata source comprises: determining, for each executable file in the folder, whether the each executable file is signed; generating, for each signed executable file, the publisher-based rule; and generating, for each unsigned executable file, one of the hash-based rule and the path-based rule in accordance with the user's specification of the one of the hash-based rule and the path-based rule for unsigned executable files.

17. A computing device communicationally coupled to a storage device and a software restriction policy store, the computing device comprising a processing unit performing steps comprising:
obtaining an excluded listing for which software restriction policy rules preventing execution of applicable executable files are to be generated;
generating, in accordance with user-specified preferred types of software restriction policy rules that are preferred by the user, a software restriction policy rule for each entry in a specified metadata source on the storage device, so long as the generated software restriction policy rule is not duplicative previously generated software restriction policy rule, the generated software restriction policy rule being an allow software restriction policy rule, allowing execution of applicable executable files, if an entry for which the allow software restriction policy rule was generated was absent from the excluded list, and the generated software restriction policy rule being a deny software restriction policy rule, preventing execution of applicable executable files, if an entry for which the deny software restriction policy rule was generated was present on the excluded list;
generating, instead of the deny software restriction policy rule, an exception to an existing allow software restriction policy rule if the existing allow software restriction policy rule is applicable to all executable files to which the deny software restriction policy rule would have applied; and
storing the generated software restriction policy rules in the software restriction policy store.

18. The computing device of claim 17, wherein the user-specified preferred types of software restriction policy rules that are preferred by the user are at least one of: a publisher-based rule, a hash-based rule, and a path-based rule.

19. The computing device of claim 17, wherein the specified metadata source comprises a folder; and wherein further the each entry in the specified metadata source comprises an executable file in the folder.

20. The computing device of claim 19, wherein the processing unit performs further steps comprising: determining, for each executable file in the folder, whether the each executable file is signed, if the user-specified preferred types of software restriction policy rules comprise a specification of a publisher-based rule.

* * * * *